United States Patent [19]

Yanus et al.

[11] Patent Number: 4,834,403
[45] Date of Patent: May 30, 1989

[54] COMBINED INFANT CAR-SEAT AND STROLLER

[76] Inventors: Theodore M. Yanus, 9014 Ola Ave., Whittier, Calif. 90603; Kevin M. Collins; Cynthia L. Collins, both of 1712 Brewster Ave., Redwood City, Calif. 94062; Robert J. Spicer, 1721 S. Cliffbranch Rd., Diamond Bar, Calif. 91765

[21] Appl. No.: 114,756
[22] Filed: Oct. 30, 1987
[51] Int. Cl.⁴ .............................................. B62B 7/12
[52] U.S. Cl. ..................................... 280/30; 74/501.6; 188/20; 280/643; 280/658; 280/47.315
[58] Field of Search .................... 280/33.99 C, 30, 37, 280/650, 642, 643, 644, 655, 658, 47.37 R, 87.01 R; 297/467; 74/483, 489, 501 R, 501 A, 502; 188/2 F, 19, 20, 83, 265

[56] References Cited

U.S. PATENT DOCUMENTS

| 2,604,333 | 7/1952 | Elmer | 280/37 |
| 2,706,642 | 4/1955 | Yarnell | 280/643 |
| 2,862,401 | 12/1958 | Gwin, Jr. | 74/489 |
| 4,191,397 | 3/1980 | Kassai | 280/650 |
| 4,216,974 | 8/1980 | Kassai | 280/650 |
| 4,567,964 | 2/1986 | Kassai | 280/642 |
| 4,632,460 | 12/1986 | Meeker et al. | 297/467 |
| 4,641,844 | 2/1987 | Mar et al. | 280/643 |

FOREIGN PATENT DOCUMENTS 420525 4/1947 Italy ..................................... 280/642

Primary Examiner—Charles A. Marmor
Assistant Examiner—Eric Culbreth
Attorney, Agent, or Firm—Bruce L. Birchard

[57] ABSTRACT

A bi-directionally convertible infant car-seat/stroller in which the conversion is effected by operating a single pushbutton which is mechanically coupled to a pair of pawls on opposite sides of the car-seat/stroller, such pawls engaging respective detents in discs or drums rotatably supported from the frame of the apparatus on opposite sides of the apparatus until withdrawn against the force of respective return-spring by the operator's actuation of a single control button which is mechanically coupled by means of flexible cables or rods to such pawls and causes such withdrawal when desired, the result of such withdrawal being the enabling of the movement of the front and rear wheel assemblies of the car-seat/stroller from an extended to a folded position and vice versa as result of the coupling of pivot arms carrying the front and rear wheel assemblies being rotatable with the disc when the pawl associated with each disc is withdrawn from the detent in the disc, as a result of which the apparatus can be converted from an infant car-seat to an infant stroller and locked in those positions without fear of danger to the infant resulting from the collapsing of the car-seat/stroller from the desired mode accidentally. The invention further provides a mechanism for adjusting and holding the handle of the car-seat/stroller in discrete, predetermined positions and selectively applying braking when in the stroller mode.

16 Claims, 5 Drawing Sheets

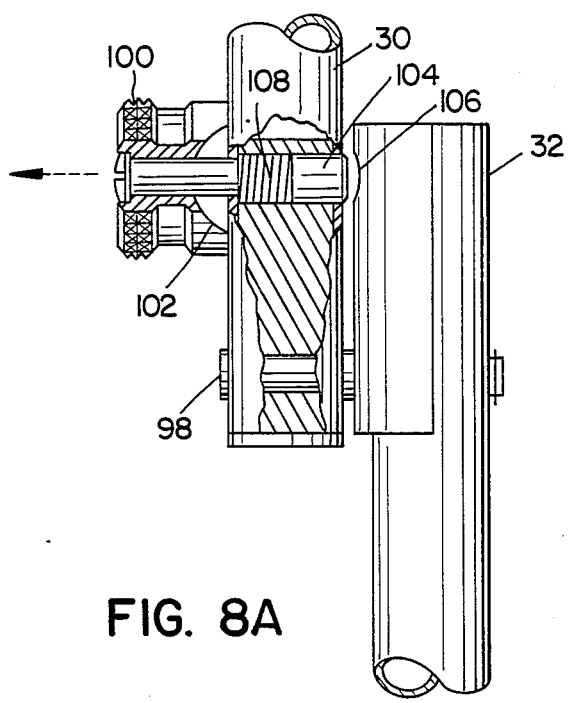
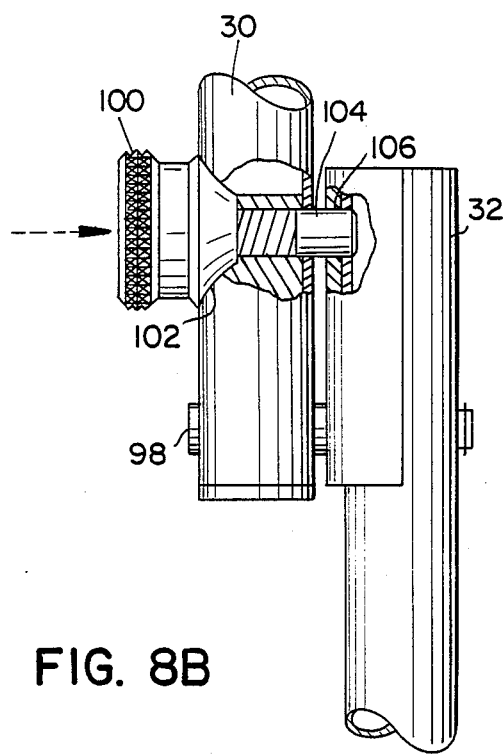
FIG. 8A    FIG. 8B
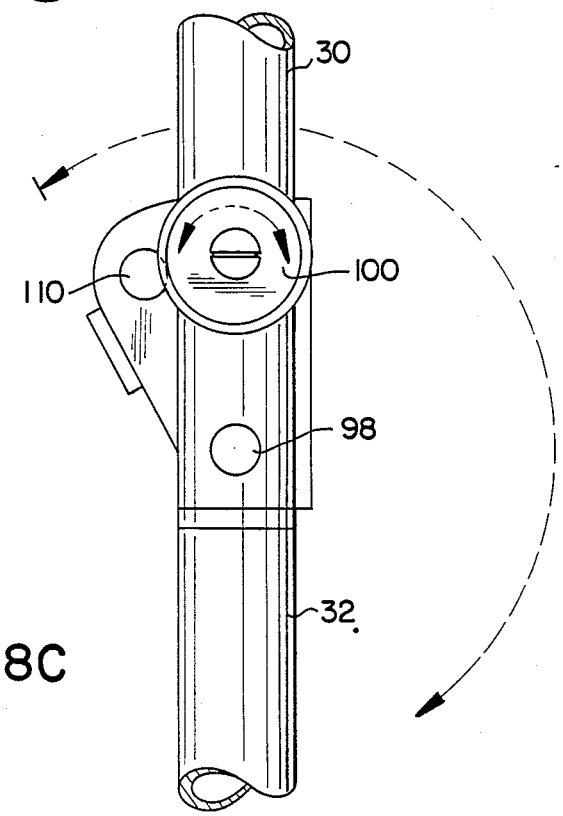
FIG. 8C

COMBINED INFANT CAR-SEAT AND STROLLER

BACKGROUND OF THE INVENTION

1. Field of the Invention

This invention relates to the field of juvenile accessories and more particularly to convertible infant-carriers.

2. Prior Art

With the almost universal availability of car transportation to the residents of the United States and other well-developed countries, it is commonplace to take an infant in an automobile or other vehicle whenever the parent or parents are traveling. At the same time, after the parent or parents have arrived at the destination of their travels, it is desirable to be able to transport the infant, or juvenile, conveniently to whereever the parent or parents wish to go. The desirability of a single product which will serve as a means for transporting the infant or juvenile while in the car and after the destination is reached has resulted in the development of certain combination car-seat/strollers for such infants. Unfortunately, to date, the devices which have been made available in the marketplace are difficult to convert from the car-seat configuration to the stroller configuration and, furthermore, are bulky and are not satisfactory, particularly when a parent who is transporting the infant is the mother. The safety of the infant is another factor which has not been adequately assured by the products which have appeared on the market up to this date.

Therefore it is an object of this invention to provide an improved convertible car-seat/stroller for infants.

It is a further object of this invention to provide a car-seat/stroller which is easy to convert from one application to the other.

It is a still further object of this invention to provide a combination car-seat/stroller which is easily convertible from one application to the other and which assures maximum safety for the infant with minimum size and weight for the convertible device.

SUMMARY OF THE INVENTION

There is provided by this invention a bi-directionally convertible infant car-seat/stroller in which the conversion is effected by operating a single pushbutton which is mechanically coupled (in one embodiment of this invention) to a pair of pawls or pins on opposite sides of the car-seat/stroller, such pawls or pins engaging respective detents or apertures in the discs or drums, respectively, rotatably supported from the frame of the apparatus on opposite sides of the apparatus until withdrawn against the force of respective return-springs by the operator's actuation of a single control button, which is mechanically coupled by means of a flexible cable to each of such pawls or pins and causes such withdrawal. After such withdrawal of the pawls or pins from the detents or apertures, respectively, the front and rear wheels of the car-seat/stroller, which are coupled to and move with the discs may be folded, with their pivot arms, about pivots provided in the frame of the device, either into the compact state (for use as a car-seat for an infant), or into the extended state (for use as a stroller), where they are locked in the selected position by the detent-pawl (or pin-drum) combinations. The conversion is simple but the structure, in either mode, is sturdy, stable and safe. The detent-pawl mechanism may be replaced by a pin-cylinder mechanism as indicated. The invention, in the stroller mode, is provided with a positive-acting brake. In the car-seat mode, the handle may be easily stowed by a push-button operation.

BRIEF DESCRIPTION OF THE DRAWINGS

The invention, both as to its structure and operation, can best be understood by reading the specification which follows in conjunction with the drawings herein, in which:

FIG. 8A is a partially cut-away view of a handle-locking mechanism, according to the present invention in a first mode;

FIG. 8B is a partially cut-away view of the handle-locking mechanism of FIG. 8A in a second mode;

FIG. 8C is a side view of the handle-locking mechanism of FIGS. 8A and 8B, with the handle extended;

DETAILED DESCRIPTION OF THE PREFERRED EMBODIMENT

Figure 1:
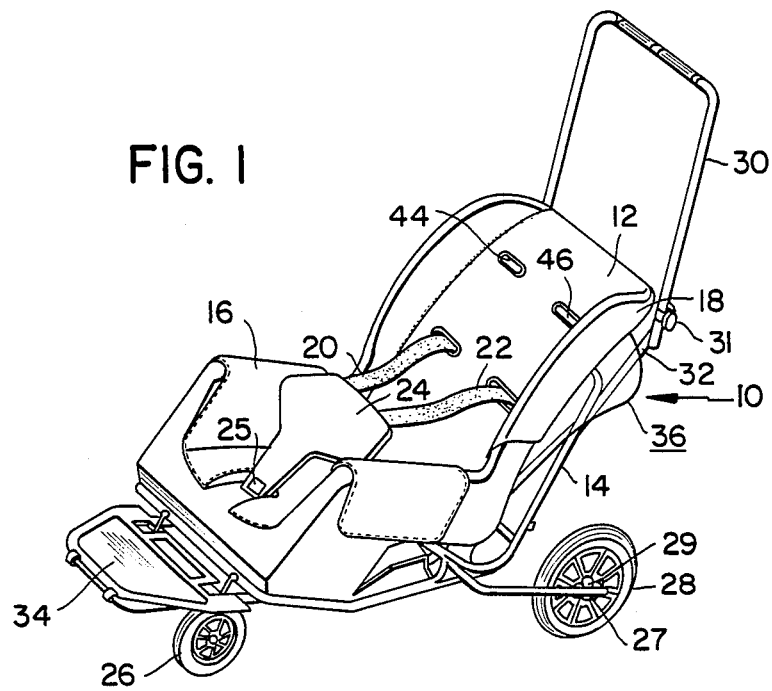
FIG. 1 is an orthogonal drawing of the car-seat/stroller, according to this invention, in the stroller mode.

In FIG. 1, car-seat/stroller 10 comprises seat 12, which may be of molded plastic and has a bottom portion 13 and a back portion 15 and is secured to and supported from frame 14. Appropriate padding such as padding 16, may be applied to the molded seat 12 to give the infant greater comfort. The upper portion of seat 12 may have a seat cover 18 for further comfort of the infant. The infant is secured in seat 12 by means of safety straps 20 and 22 in conjunction with yoke 24 which is secured at one end to straps 20 and 22 and at the other end to seat 12. The legs of the infant pass on the opposite sides of yoke 24. Pushing pushbutton 25 releases yoke 24 from seat 12 for easy application to the infant of the safety assembly comprising straps 20, 22 and yoke 24. Front wheels 26 and rear wheels 28 are pivotally supported from frame 14 in a fashion which may be seen more clearly in FIG. 5. Stroller handle 30 is pivotally supported from upright member 32 which, in turn, is supported from frame 14. Button 31 holds handle 30 in a chosen position, as will be described more fully in connection with FIGS. 8A-8C. A foot rest 34 is supported from frame 14, in part by arm 78, which can be seen in FIG. 5. A control cable 36, with appropriate covering, passes from a control pushbutton, not seen in FIG. 1, to the pawl which permits conversion of the stroller to a car-seat. The pawl 60 cannot be seen in FIG. 1 but can be seen in FIG. 5. The pushbutton 48 can be seen more clearly in FIGS. 4A, 4B and in FIG. 5. A brake mechanism, which includes button 27 and radial protrusions 29 is described more fully in connection with FIGS. 9A and 9B.

Figure 2:
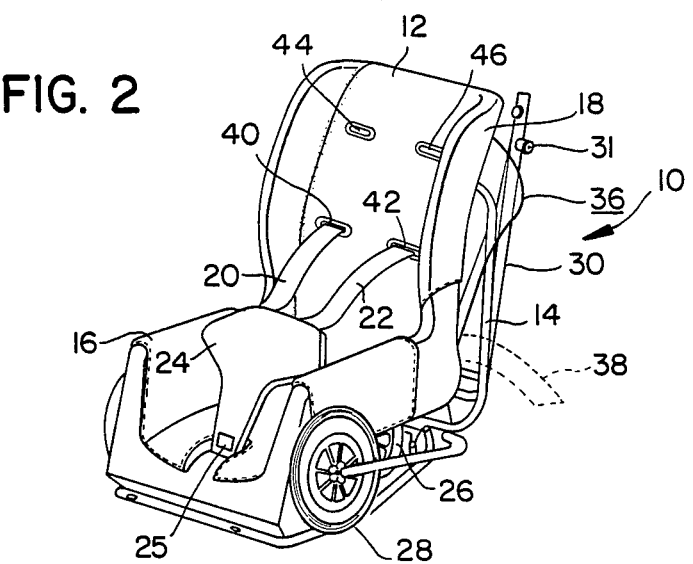
FIG. 2 is an orthogonal drawing of the car-seat/stroller, according to this invention, in the car-seat mode.

Turning to FIG. 2, the car-seat/stroller of FIG. 1 is shown in the car-seat mode. In that mode, wheels 26 and 28 are shown pivoted to the compact position. Handle 30 has also been rotated into the compact or car-seat position. In use, car-seat 10 is secured in an automobile by passing the seat-belt 38, which is not part of this invention, over frame 14, on both sides, and securing the belt buckle in the normal fashion.

In the event that the juvenile is larger and cannot be conveniently and comfortably accommodated with the seat-belts 20, 22 in the indicated positions, those seat-belts may be removed from slots 40, 42 and passed through slots 44, 46. The safety-belts are joined to a yoke at the rear of the seat and the yoke is joined with a spring or elastically biased device which at the remote end is secured to frame 1 or seat 12. The result is a continuous biasing force on safety- belts 20 and 22 so as to assure that the infant is secured in the seat 12.

Figure 3:
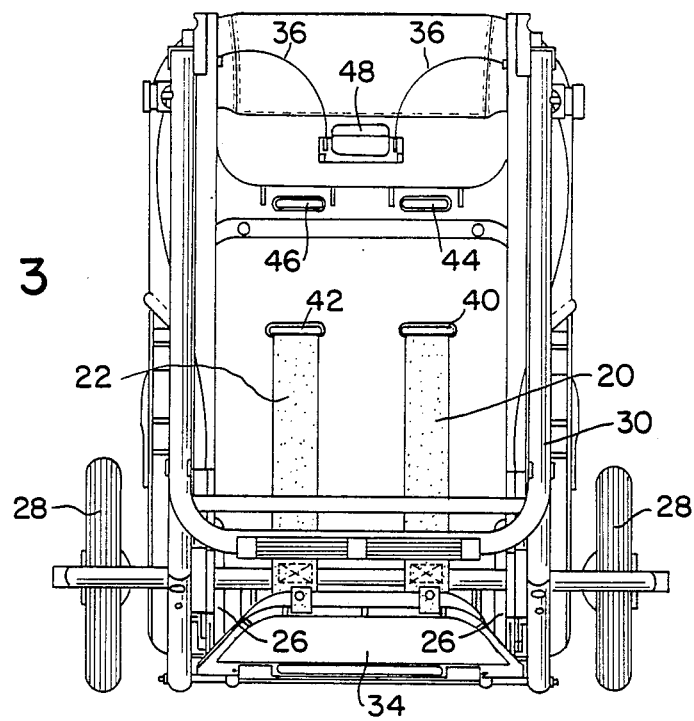
FIG. 3 is a rear view of the device of FIG. 2.

In FIG. 3 the same numerals are used for identical parts of the apparatus. In FIG. 3 it is particularly apparent that there is a button 48 which is associated with the two flexible cables 36, such cables going to opposite pawls and permitting the conversion from the stroller mode to the car-seat mode and vice versa. The details of how button 48 operates can be found in FIGS. 4A, 4B and in FIG. 5.

Figures 4A, 4B:
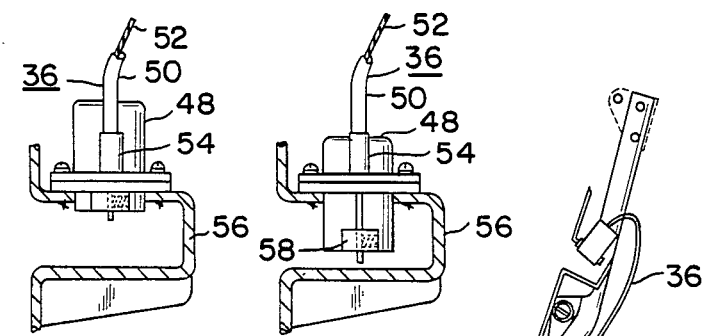
FIG. 4A is a mechanical schematic diagram, partially in cross-section, showing the conversion actuation button in the unactuated mode.
FIG. 4B is a mechanical schematic diagram, partially in cross-section, showing the conversion button in an actuated mode.

In FIGS. 4A and 4B, control cable assembly 36 includes outer sheath 50 and inner control cable 52 which is movable within sheath 50. Sheath 50 is secured to a fixture 54 which, in turn, is supported by bracket 56. Bracket 56 may be part of molded seat 12 or may be supported from frame 14 of car-seat/stroller 10.

As has been indicated, control cable 52 is free to move within sheath 50. As can be seen in FIG. 4B, control cable 52 is secured to button 48 by securing member 58 and moves with button 48. When button 48 moves downwardly within bracket 56, as shown in FIG. 4B, control cable 52 is pulled.

Figure 5:
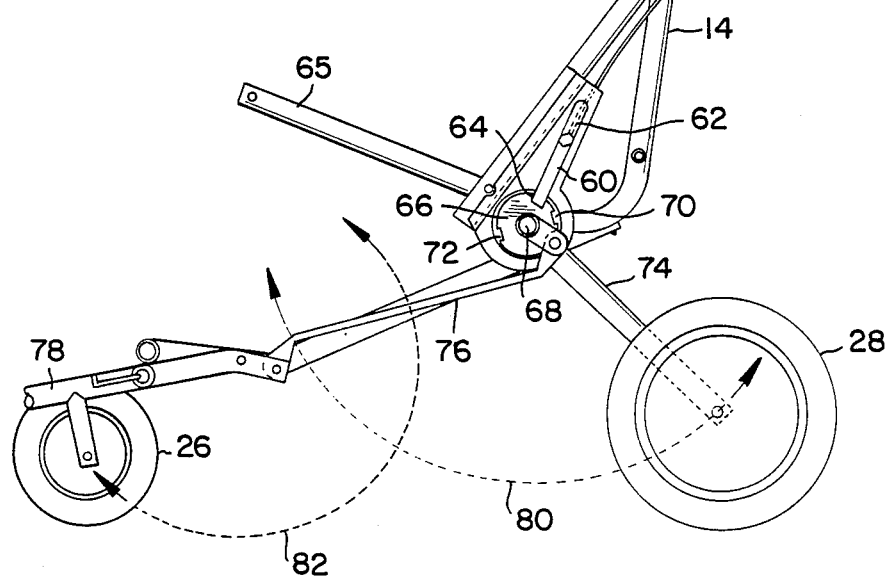
FIG. 5 is a mechanical schematic diagram, of the framework of the car-seat/stroller according to the present invention.

Turning to FIG. 5, it can be seen that the pulling of control cable 52 results in the retraction of pawl 60 against the pressure of spring 62 and pawl 60 is removed from detent 64, as a result of which disc 66 may rotate about axis 68 until button 48 is released and pawl 60 falls into detent 64, 70 or 72, at which time no further rotation of disc 66 can occur. Leg 74, which supports back wheels 28 and linkage arm 76 which is pivotally connected to support leg 78 (which supports front wheels 26) are coupled to and rotatable with disc 66. When disc 66 rotates in a clockwise direction, leg 74 and associated wheel 28 rotate in a clockwise direction along path indicated by dotted lines 80 until wheel 28 is in a stowed position. Simultaneously, the rotation of disc 66 in the clockwise direction rotates leg 78 and wheel 26 in a counter-clockwise direction until wheels 26 are stowed, as shown in FIG. 2. The position of being stowed corresponds to the falling of pawl 60 into detent 72. Thus, when button 48 is released and the wheels are rotated in the indicated directions, the pawl 60, on each side of the car-seat/ stroller will fall into the corresponding detent 72, locking wheels 26 and 28 in the stowed or car-seat position. This car-seat mode can be seen more clearly in FIG. 6.

Figure 6:
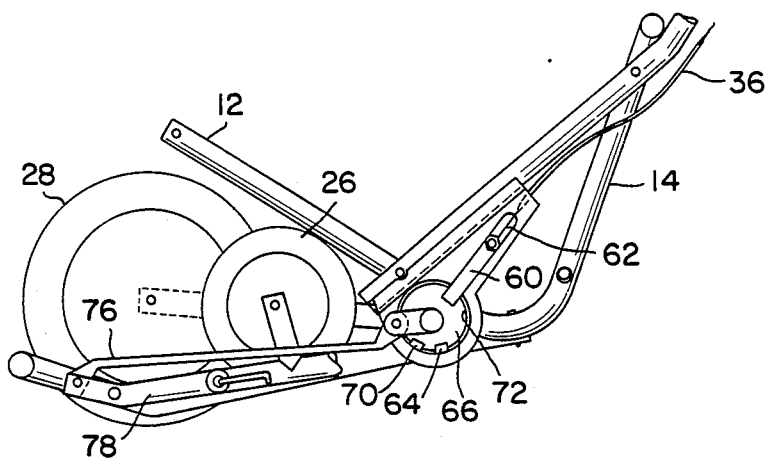
FIG. 6 is a mechanical schematic diagram of the framework of FIG. 5 in the compact, or car-seat, mode.

In FIG. 6, linkage arm 76 has been extended by the rotation of disc 66 causing arm 78, to which linkage arm 76 is connected, and wheel 26 to be rotated in the counter-clock-wise direction along the path designated by the numeral 82 in FIG. 5.

Detent 70 is provided to permit the operation of car-seat/stroller at a lower height than when detent 64 is being used. This is apparent from FIG. 5.

Figure 7:
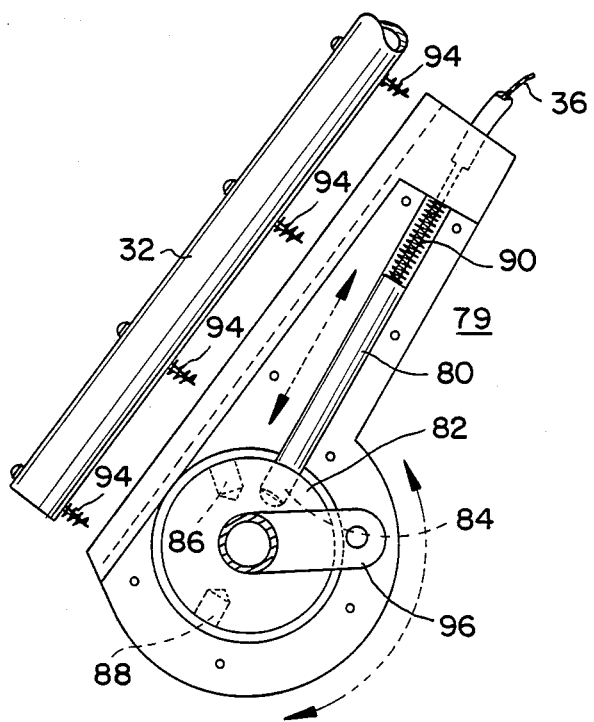
FIG. 7 is a side view of an alternative mode-locking mechanism.

In FIG. 7 the pawl-detent mechanism of FIGS. 5 and 6 has been replaced by a mode-locking mechanism 79 comprising pin 80 and cylinder 82 with receptacles 84, 86 and 88. Spring 90 biases pin 80 into the chosen,. one of receptacles 84, 86, 88. Mode-locking mechanism 79 is attached to upright member 32 by screws 94, or otherwise. Actuator arm 96 is coupled to linkage arm 76, as shown in FIG. 5.

Turning to FIGS. 8A–8C, handle 30 is pivotally supported from upright member 32 by pivot pin 98. Knob 100, which has a saddle portion 102, when in the position shown in FIG. 8A pulls pin 104 out of aperture 106 in upright member 32, against the pressure of spring 108. Handle 30 is then free to rotate, as shown in FIG. 8C. However, when knob 100 is rotated with its saddle portion 102 embracing handle 30, pin 104 is free to drop into aperture 106, thus preventing further rotation of handle 30. Several such apertures, such as aperture 110 in FIG. 8C, may be provided to permit the desired adjustment of handle 30.

Figure 9B:
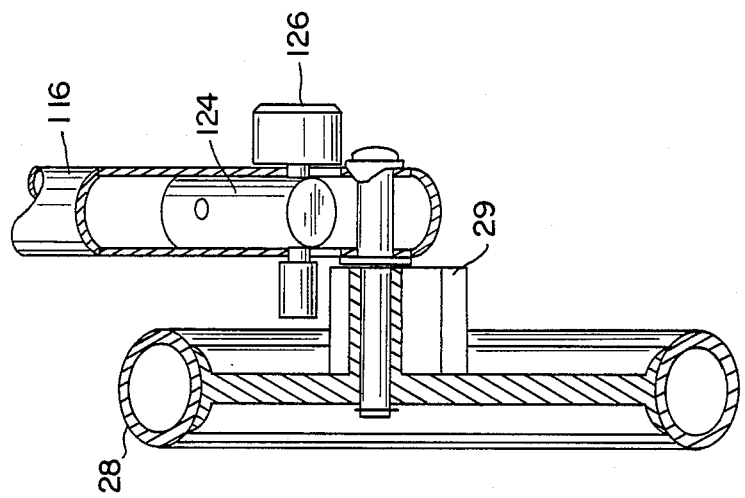
FIG. 9A is a partially cut-away elevational view of a brake mechanism for the present invention; and, FIG. 9B is a partially cut-away side view of the mechanism of FIG. 9A.
Figure 9A:
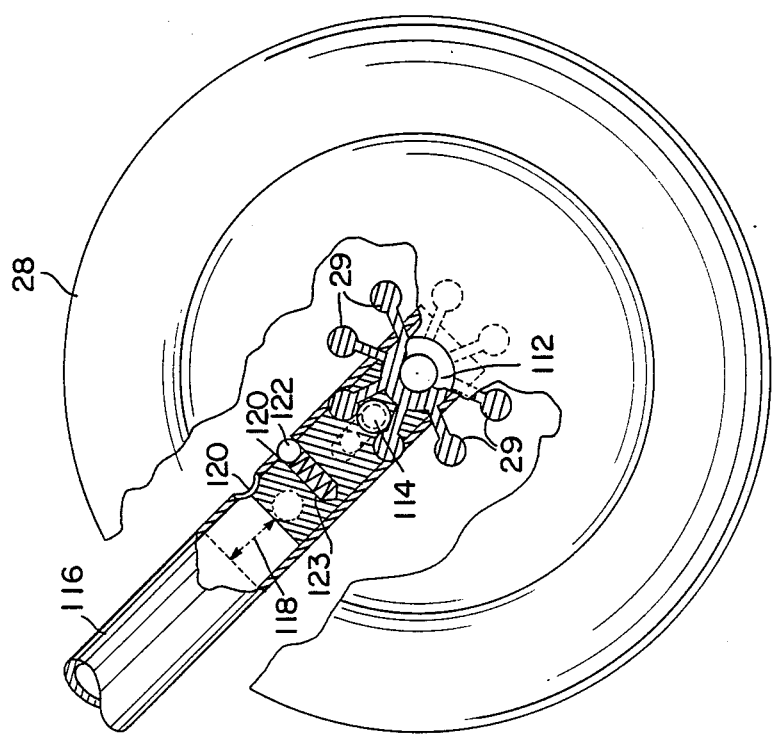

When the invention is in the stroller mode, it is necessary to provide some means to brake the stroller, for safety reasons. FIGS. 9A and 9B show a mechanism which provides that braking.

In FIGS. 9A and 9B, wheel 28 is provided at its hub 112 with radial protrusions 29. Interference rod 114 is carried slidably in structural tube 116 and can move along the axis of tube 116 a distance 118 which is sufficient to permit rod 114 to clear protrusions 29, in the unlocked condition of this brake mechanism. Opening 120 in tube 116 receives detent ball 122 to hold interference rod 114 in either the locked or unlocked position. Spring 123 biases ball 122 into the selected detent opening 120. A nylon insert 124 may be provided to give support to interference rod 114 as it passes through tube 116. Rod 114 terminates, at its outer end, in knob 27 which is used to mechanically slide interference rod 114 from its locked into its unlocked state.

While a particular embodiment of the present invention has been shown and described, it will be apparent to those skilled in the art that modifications and variations may be made without departing from the true spirit and scope of this invention. It is the purpose of the appended claims to cover all such variations and modifications.

What is claimed is:

1. A convertible car-seat/stroller including:
   a frame;
   a seat carrier by said frame and having a bottom portion and a back portion;
   pawl-receiving means rotatably coupled to said frame;
   a front wheel assembly pivotably coupled to said frame;
   a rear wheel assembly pivotably coupled to said frame;
   said front wheel assembly and said rear wheel assembly each being mechanically coupled to said pawl-receiving means for pivoting of said wheel assemblies with respect to said frame in concert with rotation of said pawl-receiving means, from a stowed, car-seat position with said front and rear wheel assemblies in close proximity to said bottom of said seat to an extended stroller position remote from said bottom portion;

said pawl-receiving means having detents therein;

pawl means carried by said frame in alignment with said pawl-receiving means for engagement of a selected one of said detents by said pawl means;

control means carried by said frame for controlling said pawl means;

said control means including a pushbutton and control coupling means connected between said pushbutton and said pawl means for positioning said pawl means into or out of said detents in said pawl-receiving means; and, spring means for urging said pawl means into said selected one of said detents in said pawl-receiving means, whereby upon engagement of said selected one of said detents by said pawl means, said pawl-receiving means and said front and rear wheel assemblies are locked in and car-seat or stroller position determined by which of said detents in said pawl-receiving means is engaged by said pawl means.

2. Apparatus according to claim 1 which includes, in addition, safety belt means passing over said seat and mechanically coupled to said seat.

3. Apparatus according to claim 2 in which said back portion has apertures therein for the passage of said safety belt means therethrough.

4. Apparatus according to claim 1 which includes, in addition, a bracket fixedly coupled to said seat and receiving said pushbutton movably therein.

5. Apparatus according to claim 1 which includes, in addition, a handle pivotably coupled to said frame.

6. Apparatus according to claim 5 which includes, in addition, positioning means for selectively positioning said handle in discrete, pre-determined positions.

7. Apparatus according to claim 1 which, when said pawl means are engaging a first of said detents in said pawl-receiving means, said front and rear wheel assemblies are extended and when said pawl means are engaging a second of said detents in said pawl-receiving means, said front and rear wheel assemblies are folded under said seat.

8. Apparatus according to claim 2, in which said pawl-receiving means includes a third one of said detents angularly proximate to said first of said detents.

9. Apparatus according to claim 1 which includes, in addition, braking means for selectively braking said apparatus when in the stroller mode.

10. Apparatus according to claim 9 in which said braking means includes an interference rod positioned to engage protrusions from the rear wheel assembly.

11. Apparatus according to claim 1 in which said pawl-receiving means comprises a pair of discs on opposite sides of said car-seat/stroller each rotatably coupled to said frame and each having said detents therein angularly aligned with the detents of the other and each having a respective one of said pawl means associated therewith, said control means being coupled to each of said respective ones of said pawl means for common control thereof by said pushbutton.

12. Apparatus according to claim 1 in which said bottom of said seat has a first width and said rear wheel assembly includes a pair of rear wheels spaced by a distance exceeding said first width of said bottom portion of said seat, said rear wheel assembly spanning said bottom portion in the car-seat mode of the car-seat/stroller.

13. Apparatus according to claim 12 in which, in the stroller mode of said apparatus, said rear wheels extend rearwardly of said seat.

14. Apparatus according to claim 1 in which said front-wheel assembly includes a pair of front wheels spaced by a distance less than a first width of said bottom portion of said seat, said front wheel assembly, in the car-seat mode of the car-seat/stroller, lying within the confines of said seat.

15. Apparatus according to claim 14 in which, in the stroller mode of said apparatus, said front wheels extend forward of said bottom portion of said seat.

16. A convertible car-seat/stroller including:

a frame;

pawl-receiving means rotatably coupled to said frame;

a seat carried by said frame and having a bottom portion having a first width and a back portion have a first length;

said frame having a base portion for supporting said bottom portion of said seat and an upright portion for supporting said back portion of said seat;

said base portion having a first outer dimension approximating the first width of said bottom portion;

a front wheel assembly pivotally coupled to said frame and carrying a pair of front wheels spaced by less than said first width, said front wheel assembly being rotatable to a position with said front wheel assembly lying within the confines of said seat;

a rear wheel assembly pivotally coupled to said frame and carrying a pair of rear wheels spaced from each other by a distance exceeding said first outer dimension of said base portion, said rear wheel assembly spanning said bottom portion of said seat in the car-seat mode of said apparatus;

said front wheel assembly and said real wheel assembly each being coupled mechanically to said pawl-receiving means for pivoting of said wheel assemblies with respect to said frame in concert with rotation of said pawl-receiving means, the axis of rotation of said rear wheel assembly being substantially coaxial with the axis of rotation of said pawl-receiving means;

said wheel assemblies, in the carseat mode of said apparatus lying not lower than the lower surface of said base portion of said frame;

said wheel assemblies, in the stroller mode, lying forwardly and rearwardly of said base portion of said frame and below the lower surface of said base portion;

pawl means carried by said frame in alignment within said pawl-receiving means for engagement of a selected detent one of said detents carried by said pawl means;

control means carried by said frame for controlling said pawl means;

said control means including a pushbutton and control coupling means connected between said pushbutton and said pawl means for positioning said pawl means into or out of said detents in said pawl-receiving means; and, spring means for urging said pawl means into said selected one of said detents in said pawl-receiving means, whereby upon engagement of said selected one of said detents by said pawl means, said pawl-receiving means and said front and rear wheel assemblies are locked in a preselected position determined by which of said detents in said pawl-receiving means is engaged by said pawl means.

* * * * *